(12) United States Patent
Yamada et al.

(10) Patent No.: US 7,062,102 B2
(45) Date of Patent: Jun. 13, 2006

(54) APPARATUS FOR RE-CODING AN IMAGE SIGNAL

(75) Inventors: Yoshihisa Yamada, Tokyo (JP); Shinichi Kuroda, Tokyo (JP); Kazuo Sugimoto, Tokyo (JP); Fuminobu Ogawa, Tokyo (JP); Kohtaro Asai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 633 days.

(21) Appl. No.: 09/982,008

(22) Filed: Oct. 19, 2001

(65) Prior Publication Data

US 2002/0051580 A1 May 2, 2002

(30) Foreign Application Priority Data

Oct. 23, 2000 (JP) .............................. 2000-322469

(51) Int. Cl.
*G09K 9/46* (2006.01)

(52) U.S. Cl. .................. 382/248; 382/235; 382/250

(58) Field of Classification Search ................ 382/232, 382/239, 250, 238, 245, 246, 271, 270, 235, 382/236, 233, 248; 708/402; 348/438.1; 375/240.13, 240.25, 240.29
See application file for complete search history.

(56) References Cited

U.S. PATENT DOCUMENTS

| | | | | |
|---|---|---|---|---|
| 5,486,862 A | * | 1/1996 | Yagasaki | 375/240.08 |
| 5,510,839 A | * | 4/1996 | Hamano et al. | 375/240.16 |
| 5,557,330 A | * | 9/1996 | Astle | 348/394.1 |
| 5,831,688 A | * | 11/1998 | Yamada et al. | 348/699 |
| 5,991,452 A | * | 11/1999 | Shimizu et al. | 382/248 |
| 6,473,459 B1 | * | 10/2002 | Sugano et al. | 375/240.16 |
| 6,496,228 B1 | * | 12/2002 | McGee et al. | 348/700 |
| 6,683,989 B1 | * | 1/2004 | Fujiwara et al. | 382/239 |
| 6,735,253 B1 | * | 5/2004 | Chang et al. | 375/240.16 |
| 6,741,793 B1 | * | 5/2004 | Sugiyama | 386/68 |
| 6,785,429 B1 | * | 8/2004 | Senoh | 382/305 |

FOREIGN PATENT DOCUMENTS

| | | |
|---|---|---|
| JP | 10-032829 | 2/1998 |
| JP | 2000-224587 | 8/2000 |
| WO | WO 200022831 A1 * | 4/2000 |

* cited by examiner

*Primary Examiner*—Joseph Mancuso
*Assistant Examiner*—Dennis Rosario
(74) *Attorney, Agent, or Firm*—Birch, Stewart, Kolasch & Birch, LLP

(57) ABSTRACT

An apparatus for re-coding an image signal, which conducts re-coding processing using a decoded image signal subjected to coding processing as an input image signal, includes: a DCT unit for subjecting the input image signal to a discrete cosine transform (DCT); a DCT coefficient counter for counting a feature amount on a picture basis using a DCT coefficient output from the DCT unit; a picture type detector for detecting a picture type in coding processing in a previous stage, using the feature amount output from the DCT coefficient counter; a coding control portion for determining coding parameters in re-coding in accordance with detection results of the picture type detector; and a coding portion for conducting re-coding processing, using the coding parameters determined by the coding control portion.

23 Claims, 6 Drawing Sheets

APPARATUS FOR RE-CODING AN IMAGE SIGNAL

This application is based on Application No. 2000-322469, filed in Japan on Oct. 23, 2000, the contents of which are hereby incorporated by reference.

BACKGROUND OF THE INVENTION

1. Field of the Invention

The present invention relates to an apparatus for re-coding an image signal in which, when an image signal once decoded after being coded is re-coded, coding deterioration can be minimized in re-coding even if coding parameters in the previous coding are not obtained.

2. Description of the Related Art

Various kinds of coding procedures for reducing an information amount of a digital image signal have been proposed, and a plurality of procedures have already been established as international standards Among them, in the case where an image signal coded by a coding method (e.g., ITU-T recommendation H 261 or H.263, ISO/IEC standard MPEG, etc.) adopting a procedure of inter-frame predictive coding is edited in a coded bit stream, there are various constraints. Therefore, an operation becomes easier if a coded image signal is edited after being once decoded into an image signal, followed by being re-coded.

However, if a coded image signal is re-coded after being decoded, generally, marked coding deterioration occurs In order to avoid this, it is known that the same coding parameters as those used in the previous coding may be used for re-coding. Examples of coding parameters include a "picture type" representing predictive methods such as intra frame prediction (I-picture)/forward inter-frame prediction (P-picture)/bidirectional inter-frame prediction (B-picture), a "quantization step size" used for quantization processing, and a "motion vector" used for motion compensation prediction. Among them, the "picture type" has the largest effect on the quality of a re-coded image, which is an important parameter.

The above-mentioned parameters can be output together with a decoded image signal from a decoder for decoding a coded bit stream to an image signal. However, it is also assumed that the decoder does not have a function of outputting parameters, and only a decoded image signal is obtained due to the loss of output parameter data As a procedure for extracting parameters from a decoded image signal in the case where only a decoded image signal is obtained, for example, Japanese Patent Application Laid-open No. Hei 10-32829 discloses the following procedure FIG. 6 is a block diagram showing a configuration of a recoding apparatus disclosed in Japanese Patent Application Laid-open No. Hei 10-32829

In FIG. 6, reference numerals 10, 11, and 12 denote a pre-processing portion, a coding control portion, and a coding portion. The preprocessing portion 10 is composed of an intra frame coder 20, an SNR calculator 21, and an I-picture detector 22.

Hereinafter, an operation of the above-mentioned re-coding apparatus will be described.

It is assumed that an input image signal 31 input to the re-coding apparatus is an image subjected to at least one coding processing, of which coded bit stream is decoded by a decoder (not shown). The intra frame coder 20 intra frame codes all the input image signals 31 using a fixed quantization step size, and outputs a bit stream 41. The SNR calculator 21 calculates an SNR value from the coded bit stream 41 and outputs an SNR value 42. The I-picture detector 22 detects the position of an I-picture from the SNR value 42 The coding control portion 11 uses the results detected by the I-picture detector 22 to output a control signal 32 for controlling coding processing of the coding portion 12. The coding portion 12 codes the input image signal 31 based on the control signal 32 and outputs a coded bit stream 33.

According to the above-described prior art, the SNR calculator 21 measures an SNR of an image signal. However, a procedure thereof is not particularly specified In the apparatus configuration shown in FIG. 6, in order to measure an SNR in the SNR calculator 21, it is required that the input bit stream 41 is once decoded to obtain a decoded image signal, and calculation processing (in which sum of square differences is calculated in order to obtain an SNR) is conducted between the decoded image signal and the input image signal 31.

Furthermore, the intra frame coder 20 needs to output the bit stream 41. Therefore, in the case of using a coding method such as MPEG, at least a discrete cosine transform (DCT) unit, a quantizer, and a vanable-length coder (VLC) are required.

Thus, in the conventional re-coding apparatus, the intra frame coder 20 and the SNR calculator 21 in the pre-processing portion are large in size, and the calculation amount also becomes large. Furthermore, although the detection procedure of an I-picture is specified, the detection procedure of a P-picture/B-picture is not specified.

SUMMARY OF THE INVENTION

Therefore, with the foregoing in mind, it is an object of the present invention to provide an apparatus for re-coding an image signal capable of enhancing a coding efficiency by detecting a picture type from an image signal in re-coding an image signal subjected to coding processing.

According to the present invention, an apparatus for re-coding an image signal which conducts re-coding processing using a decoded image signal subjected to coding processing as an input image signal and which is characterized by including: a DCT unit for subjecting the input image signal to DCT; a DCT coefficient counter for counting a feature amount on a picture basis using a DCT coefficient output from the DCT unit, a picture type detector for detecting a picture type in coding processing in a previous stage, using the feature amount output from the DCT coefficient counter, a coding control portion for determining coding parameters in re-coding in accordance with detection results of the picture type detector; and a coding portion for conducting recoding processing, using the coding parameters determined by the coding control portion.

An apparatus for re-coding an image signal is characterized in that, the picture type detector includes as a picture type to be detected, at least two of three kinds of picture types of an intra frame coding picture, a forward inter-frame predictive coding picture, and a bi-directional inter-frame predictive coding picture.

An apparatus for re-coding an image signal is characterized in that, the DCT coefficient counter counts as a feature amount, a sum of absolute values or a sum of squares on a frequency region basis of DCT coefficients, and that the picture type detector detects a picture type in accordance with time variations with time of the sum of absolute values or the sum of squares thus obtained.

An apparatus for re-coding an image signal is characterized in that, the picture type detector detects, as an intra frame coding picture, a picture whose sum of absolute values or sum of squares in a high-frequency region is smaller than those of previous and subsequent pictures.

An apparatus for re-coding an image signal is characterized in that, the picture type detector detects, as an intra frame coding picture or a forward inter-frame coding picture, a picture whose sum of absolute values or sum of squares in a low-frequency region is larger than those of previous and subsequent pictures.

An apparatus for re-coding an image signal is characterized in that, the DCT coefficient counter counts, as a feature amount, the number of DCT coefficients whose absolute values are larger or smaller than previously set threshold values, and that the picture type detector detects a picture type in accordance with the obtained number An apparatus for re-coding an image signal is characterized in that, the picture type detector detects, as an intra frame coding picture, a picture having a smaller number of DCT coefficients whose absolute values are larger than threshold values and a picture having a larger number of DCT coefficients whose absolute values are smaller than threshold values.

An apparatus for re-coding an image signal is characterized in that, the coding control portion determines coding parameters using the picture type detected by the picture type detector.

An apparatus for re-coding an image signal is characterized in that, the coding control portion determines coding parameters, using an intended coding amount set in accordance with the picture type detected by the picture type detector.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Figure 1:
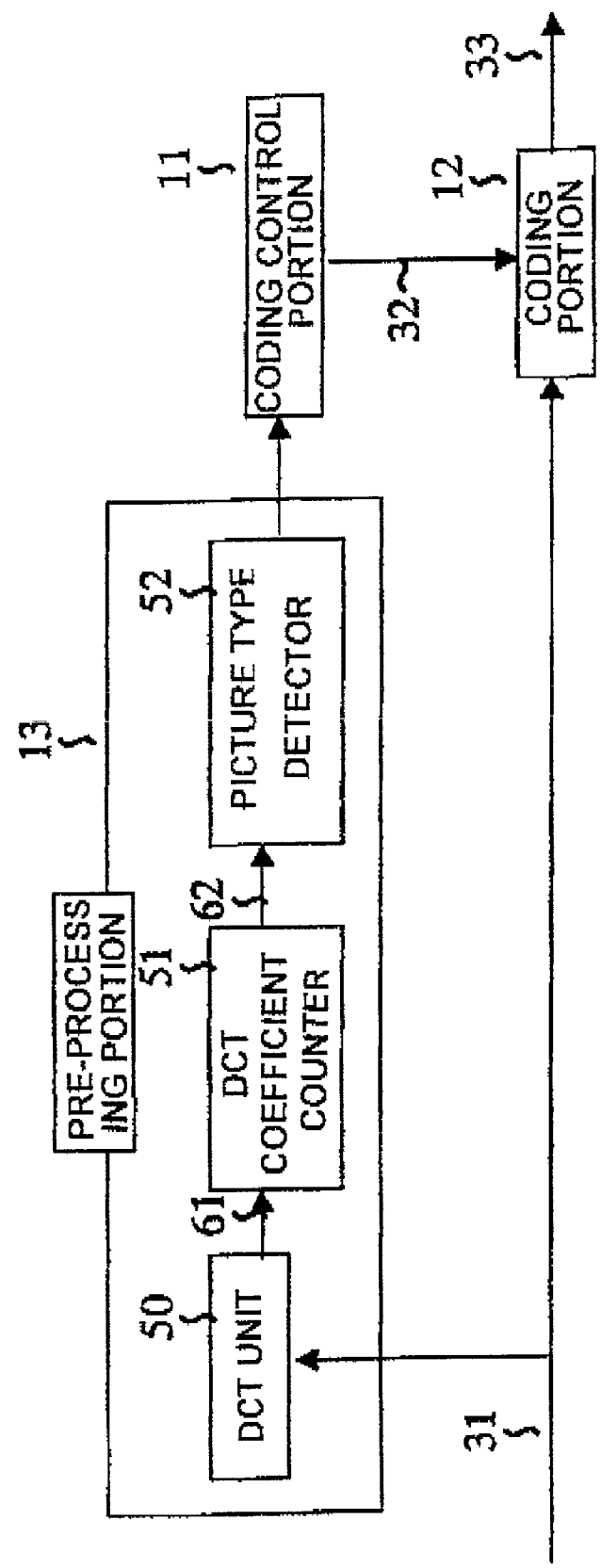
FIG. 1 is a schematic block diagram showing a configuration of an apparatus for re-coding an image signal of Embodiment 1 according to the present invention.

FIG. 1 is a schematic block diagram showing a configuration of an apparatus for re-coding an image signal of Embodiment 1 according to the present invention In FIG. 1, a pre-processing portion 13 in Embodiment 1 is composed of a DCT unit 50 for subjecting an input image signal to a discrete cosine transform (DCT), a DCT coefficient counter 51 for counting feature amounts on the picture basis, using a DCT coefficient output from the DCT unit 50, and a picture type detector 52 for detecting a picture type in coding processing in the previous stage, using the feature amounts output from the DCT coefficient counter 51. The remaining parts are the same as those in the conventional example. The coding control portion 11 determines coding parameters in re-coding in accordance with results of detection of a picture type, and a coding portion 12 conducts re-coding processing using the determined coding parameters.

Next, an operation of the above-mentioned re-coding apparatus will be described.

Figure 2:
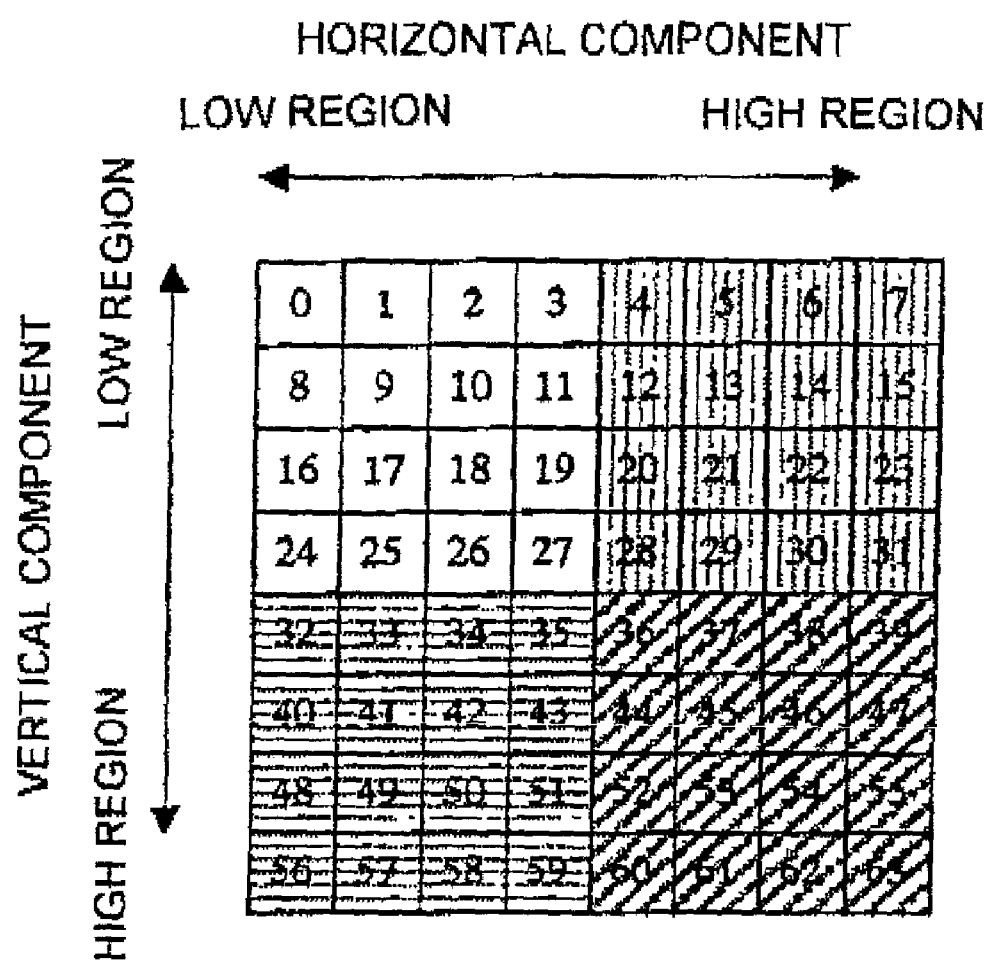
FIG. 2 is a view illustrating frequency characteristics of sixty-four DCT coefficients output from a DCT unit 50 in FIG. 1.

An input image signal 31 is input to the DCT unit 50 of the pre-processing portion 13. The DCT unit 50 conducts the same two-dimensional DCT as that conducted in general image coding, and outputs DCT coefficients 61 composed of sixty-four frequency components. FIG. 2 shows frequency characteristics of sixty-four DCT coefficients output from the DCT unit 50.

The DCT coefficient counter 51 obtains the sum of absolute values or the sum of squares on the frequency component basis for each picture unit, and outputs an power value 62 of each frequency component. Alternatively, an average value may be obtained on the frequency component basis, and the sum of absolute value differences or the sum of square differences may be obtained from the average value.

The picture type detector 52 detects a picture type of each picture.

Figure 3:
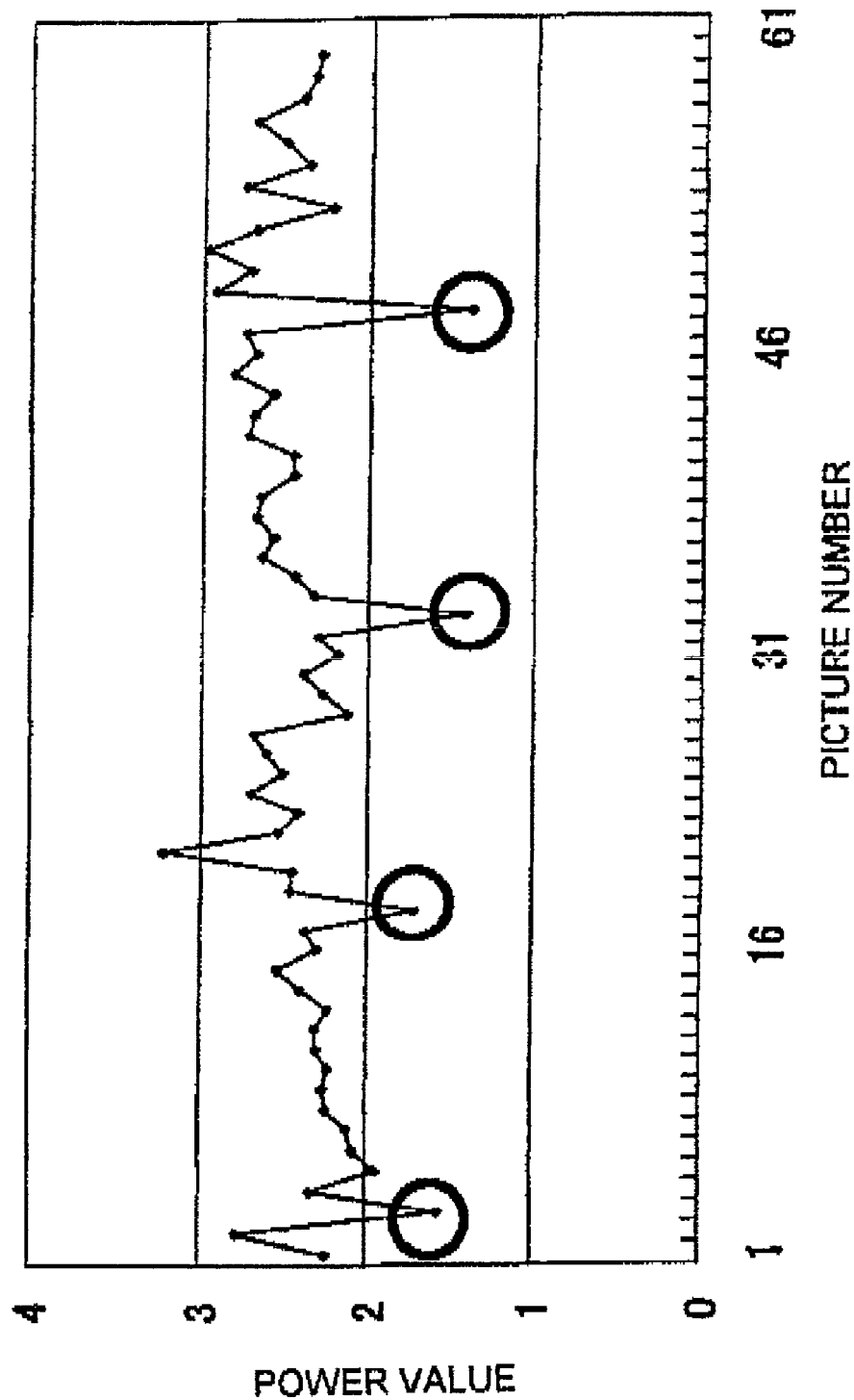
FIG. 3 is a graph showing power values where horizontal components of DCT coefficients and vertical components thereof are both in a high region (shaded portions in FIG. 2)
Figure 4:
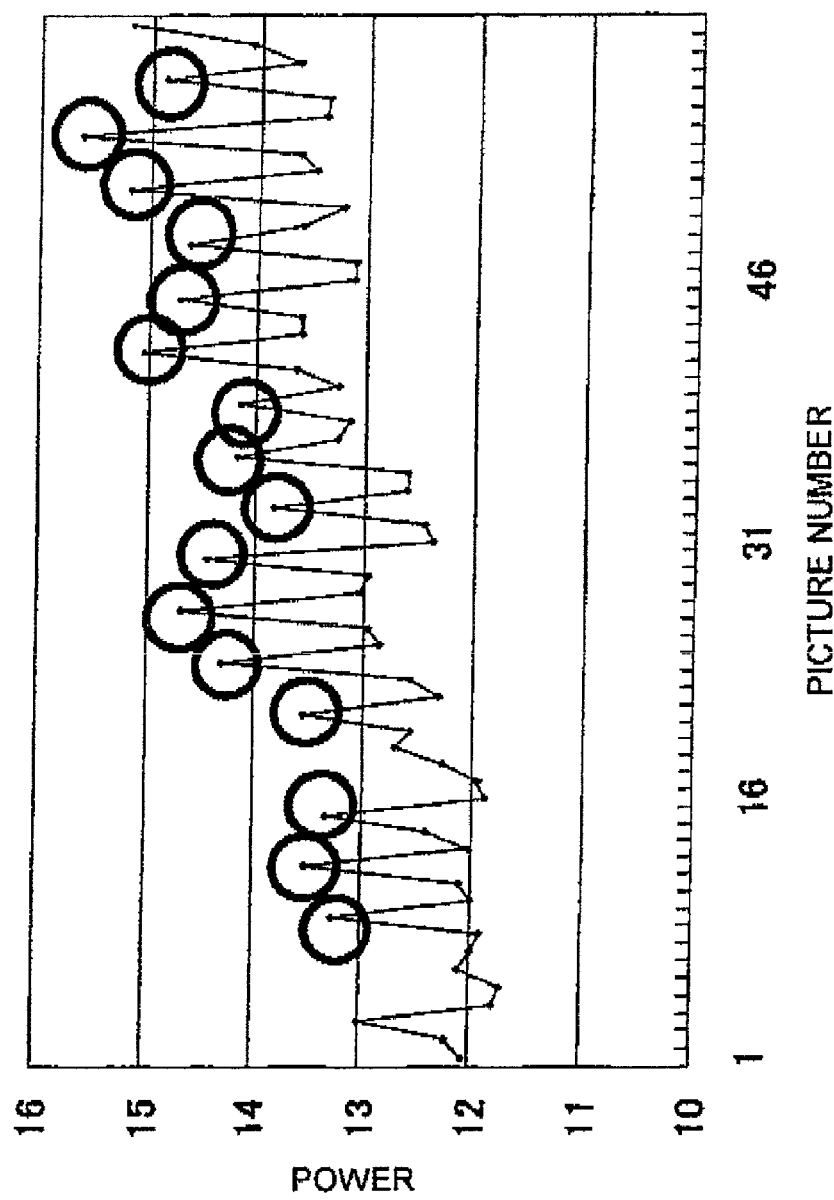
FIG. 4 is a graph showing power values where horizontal components of DCT coefficients are in a low region and vertical components thereof are in a high region (horizontal line portions in FIG. 2) or power values where horizontal components of DCT coefficients are in a high region and vertical components thereof are in a low region (vertical line portions in FIG. 2)

FIG. 3 is a graph showing power values where horizontal components of DCT coefficients and vertical components thereof are both in a nigh region (shaded portions in FIG. 2). FIG. 4 is a graph showing power values where horizontal components of DCT coefficients are in a low region and vertical components thereof are in a high region (horizontal line portions in FIG. 2) or power values where horizontal components of DCT coefficients are in a high region and vertical components thereof are in a low region (vertical line portions in FIG. 2). A picture that is an I-picture in coding processing in the previous stage has a tendency of having insufficient high-frequency components of DCT coefficients, compared with a P-picture and a B-picture, for example, as represented by circles in the graph shown in FIG. 3. Therefore, a picture whose electric value 62 of a high-frequency component is smaller than those of the previous and subsequent pictures is detected as an I-picture. More specifically, a picture whose previous and subsequent pictures have a deviation of power values that is smaller than the previously set value is detected as an I-picture.

Furthermore, in coding processing in the previous stage, pictures that are an I-picture and a P-picture have a tendency that power values of low-frequency components of DCT coefficients are increased compared with a B-picture, for example, as represented by circles in the graph shown in FIG. 4. Therefore, a picture whose electric value 62 is larger than those of the previous and subsequent pictures is detected as an I-picture or a P-picture. More specifically, a picture whose previous and subsequent pictures have a deviation of power values that is larger than a previously set value is detected as an I-picture or a P-picture. Therefore, by combining FIGS. 3 and 4, an I-picture is detected from FIG. 3. If positions of circles detected as the I-picture are eliminated from FIG. 4, a P-picture can be specifically detected.

The coding control portion 11 sets various coding parameters in accordance with a picture type detected by the picture type detector 52, and controls coding processing of the coding portion 12.

The coding control portion 11 controls coding processing of the coding portion 12 in such a manner that coding processing is conducted with the same picture type as that detected by the picture type detector 52. Because of this, re-coding processing can be conducted with less image quality deterioration.

Furthermore, the coding control portion 11 controls the coding portion by setting an intended code amount in accordance with the detected picture type. Because of this, a code amount can be distributed so as to be appropriate for a bit rate of the bit stream 33 output in re-coding processing.

It is also effective that, among sixty-four frequency components, a plurality of DCT coefficients are specified as low-frequency components (e.g., sixteen unmarked portions in FIG. 2) and high-frequency components (a g., sixteen shaded portions in FIG. 2), and the sum of absolute values/sum of squares of these plural coefficients are obtained collectively in the DCT Coefficient counter 51. In this case, the number of power values 62 to be output is not sixty-four, but they are outputted corresponding to a predetermined number of components.

In the case where one frame signal is an interlace signal composed of two field signals, there are a method for coding two field signals independently (called a field configuration in the case of MPEG-2), and a method for coding two field signals collectively (called a frame configuration in the case of MPEG-2). In the case of the frame configuration, two field signals are alternately disposed, so that one block occupies a substantially square portion (a horizontal side and a vertical side are almost equal to each other) on a screen. In the case of the field configuration, only one field signal is disposed, so that one block occupies a rectangular portion (a vertical side is almost twice as long as a horizontal side). Therefore, it is known that, in the case of an interlace signal, the correlation in the vertical direction becomes lower than that in the horizontal direction both in the field configuration and the frame configuration.

Therefore, in the case where an input image signal is an interlace signal, a number of signals are generated in high-frequency components in the vertical direction. Therefore, a picture type is detected using low-frequency components (e.g., a region of the horizontal line portions in FIG. 2) and high-frequency components (e.g., a region of shaded portions in FIG. 2) in the horizontal direction, without using low-frequency components and high-frequency components in the vertical direction. Because of this a detection precision can be enhanced.

Embodiment 2

Next, an apparatus for recoding an image signal of Embodiment 2 will be described.

The configuration of the apparatus for re-coding an image signal of Embodiment 2 is the same as that of Embodiment 1 shown in FIG. 1.

Figure 5:
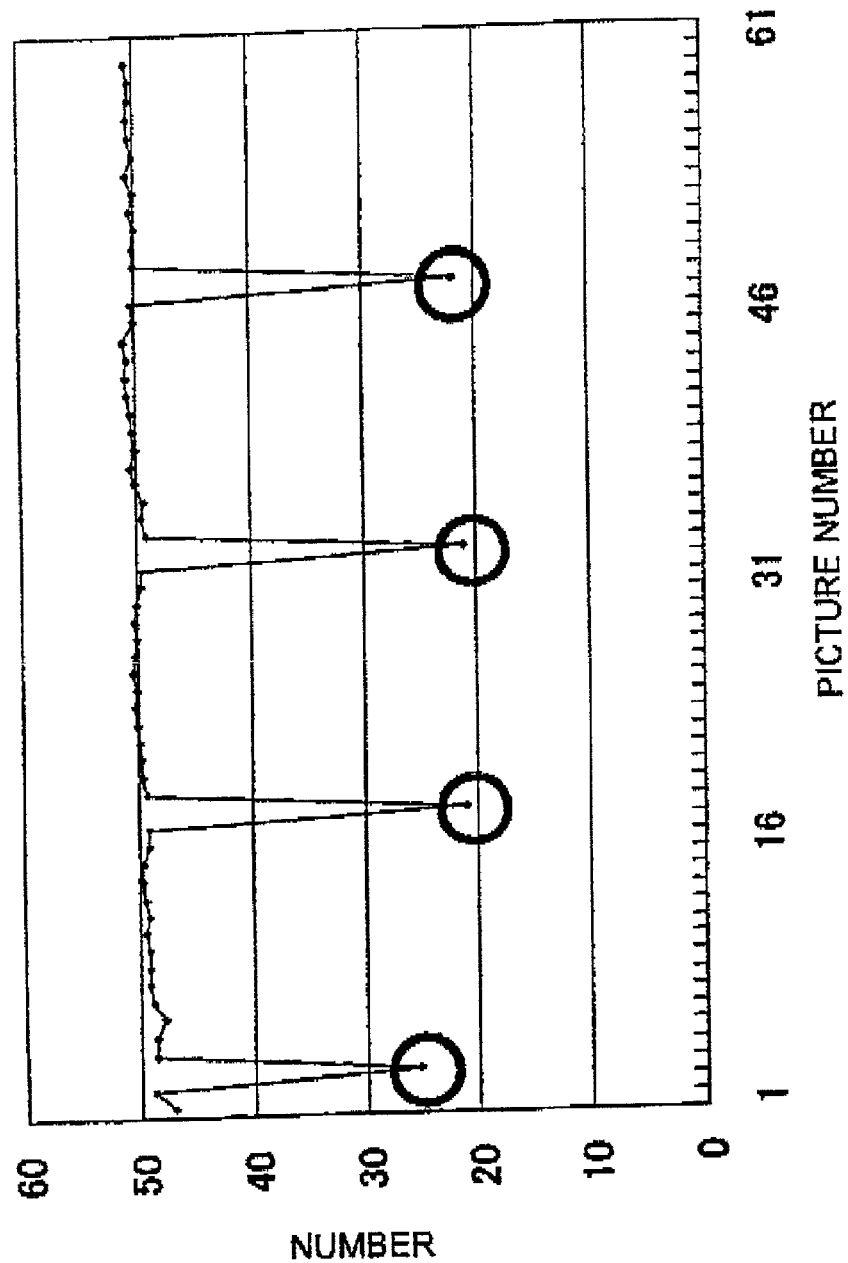
FIG. 5 is a view illustrating changes in number of coefficients among sixty-four DCT coefficients whose absolute value components are larger than threshold values previously set in a DCT coefficient counter on the picture basis.
Figure 6:
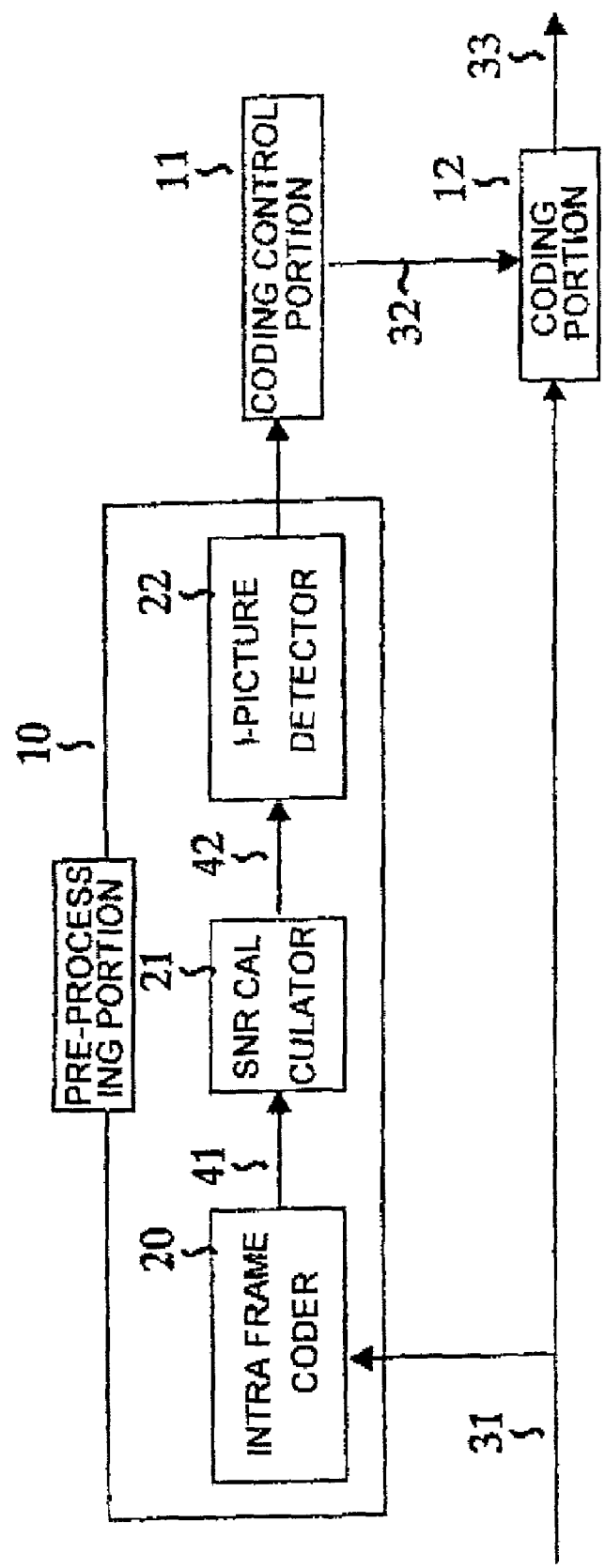
FIG. 6 is a block diagram showing a configuration of an apparatus for recoding an image signal disclosed by Japanese Patent Application Laid-open No. Hei 10-32829

Herein, a DCT coefficient counter 51 of Embodiment 2 is previously set for threshold values so as to obtain the number of coefficients among sixty-four DCT coefficients whose absolute components are larger or smaller than the threshold values A picture that is an I-picture in coding processing in the previous stage has a tendency that more DCT coefficients are generated which have values of 0 or those in the vicinity of 0, compared with a P-picture or a B-picture. FIG. 5 shows a time transition of the number of DCT coefficients whose absolute values are larger than threshold values Circles in FIG. 5 represent positions where I-pictures are obtained in coding processing in the previous stage The picture type detector 52 detects a picture, as an I-picture, which has a smaller number of DCT coefficients larger than threshold values or which has a larger number of DCT coefficients smaller than threshold values, compared with the previous and subsequent pictures.

Furthermore,a detection precision can also be enhanced by combining Embodiments 1 and 2. For example, by using FIGS. 3 and 5 together, a detection precision of an I-picture can be further enhanced. Furthermore, a P-picture can be specifically detected by using FIGS. 4 and 5

Furthermore, the pre-processing portion 13 may extract a part of a screen and input it, instead of inputting the entire Input image signal to the DCT unit 50 A processing amount can be reduced.

Furthermore, in Embodiments 1 and 2, the pre-processing portion 13 and the coding portion 12 have been described separately. However, the coding portion 12 and the pre-processing portion 13 can also share the same DCT unit. In this case, the circuit of the DCT unit can be reduced.

Furthermore, even with an input image signal processed as an I-picture in the coding portion 12 or an input image signal processed as a P-picture or a B-picture in the coding portion 12, the same DCT coefficients as those output from the DCT unit 50 in the pre-processing portion are generated in the coding portion 12 with respect to a micro-block subjected to intra frame coding. Therefore, the results of the DCT unit 50 can be stored in a memory or the like so as to be re-used. In this case, the number of processing of DCT in the coding portion 12 can be reduced.

In Embodiment 1, the "picture type" and the "Intended coding amount" have been illustrated as coding parameters controlled by the coding control portion 11 However, for example, other coding parameters such as a "quantization matrix", a "variable-length coding language table selection number", and a "motion vector search range" can be controlled, which can be set on the picture basis in the case of MPEG coding.

As described above, according to the present invention, there are provided a DCT unit for subjecting an input image signal to DCT, a DCT coefficient counter for counting the feature amount on the picture basis using DCT coefficients output from the DCT unit a picture type detector for detecting a picture type in coding processing in the previous stage, using the feature amount output from the DCT coefficient counter, a coding control portion for determining coding parameters in re-coding in accordance with detection results of the picture type detector, and a coding portion for conducting re-coding using the coding parameters determined by the coding control portion. Therefore, a coding efficiency can be enhanced by detecting a picture type from an image signal in re-coding an image signal subjected to coding processing Furthermore, compared with a conventional re-coding apparatus, a processing circuit and a processing amount of the picture type detector can be reduced.

Furthermore, by including at least two of three kinds of picture types: an intra frame coding picture (I-picture), a forward inter-frame predictive coding picture (P-picture), and a bi-directional inter-frame predictive coding picture (B-picture) as picture types detected by the picture type detector, an individual picture type can be detected with respect to a decoded image signal group composed of an I-picture and a P-picture and a decoded image signal group composed of three kinds of I, P, and B-pictures.

Furthermore, the DCT coefficient counter counts, as a feature amount, the sum of absolute values or the sum of squares on the frequency region basis of DCT coefficients, and the picture type detector detects a picture type in accordance with variations with time of the sum of absolute values or the sum of squares thus obtained, whereby a picture type can be detected with a smaller processing amount compared with that in a conventional re-coding apparatus.

Furthermore, the picture type detector detects, as an intra frame coding picture, a picture whose sum of absolute values or sum of squares in a high-frequency region is smaller than those of the previous and subsequent pictures, whereby an intra frame coding picture can be detected.

Furthermore, the picture type detector detects, as an intra frame coding picture or a forward inter-frame coding picture, a picture whose sum of absolute values or sum of squares in a low-frequency region is larger than those of the previous and subsequent pictures, whereby an intra frame coding picture and a forward inter-frame coding picture can be detected, In other words, a bidirectional predictive coding picture can be detected.

Furthermore, the DCT coefficient counter counts, as a feature amount, the number of DCT coefficients whose absolute values are larger or smaller than the previously set threshold values, and the picture type detector detects a picture type in accordance with the number thus obtained, whereby an intra frame coding picture can be detected.

Furthermore, the picture type detector detects, as an intra frame coding picture, a picture having a smaller number of DCT coefficients whose absolute values are larger than threshold values or a picture having a larger number of DCT coefficients whose absolute values are smaller than threshold values, whereby an intra frame coding picture can be detected.

Furthermore, the coding control portion determines coding parameters using the picture type detected by the picture type detector so that coding processing is conducted with the same picture type as that in the previous stage, whereby re-coding processing with a satisfactory efficiency can be conducted with less image quality deterioration.

Furthermore, the coding control portion determines coding parameters using an intended coding amount set in accordance with the picture type detected by the picture type detector so that coding processing is conducted with the same picture type as that in the previous stage, whereby re-coding processing with a satisfactory efficiency can be conducted.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for re-coding an image signal, which conducts re-coding processing using a decoded image signal subjected to coding processing as an input image signal, comprising:
   a DCT unit for subjecting the input image signal to a discrete cosine transform (DCT);
   a DCT coefficient counter for counting a feature amount on a high or low frequency-region basis using an unquantized DCT coefficient output from said DCT unit;
   a picture type detector for detecting a picture type in coding processing in a previous stage, using the feature amount output from said DCT coefficient counter;
   a coding control portion for determining coding parameters in re-coding in accordance with detection results of said picture type detector; and
   a coding portion for conducting re-coding processing, using the coding parameters determined by said coding control portion.

2. The apparatus for re-coding an image signal according to claim 1, wherein said picture type detector includes, as a picture type to be detected, at least two of three kinds of picture types of an intra frame coding picture, a forward inter-frame predictive coding picture, and a bi-directional inter-frame predictive coding picture.

3. The apparatus for re-coding an image signal according to claim 1, wherein said DCT coefficient counter counts, as a feature amount, a sum of absolute values or a sum of squares on a frequency region basis of DCT coefficients, and
   said picture type detector detects a picture type in accordance with variations with time of the sum of absolute values or the sum of squares thus obtained.

4. The apparatus for re-coding an image signal according to claim 3, wherein said picture type detector detects, as an intra frame coding picture, a picture whose sum of absolute values or sum of squares in a high-frequency region is smaller than those of previous and subsequent pictures.

5. The apparatus for re-coding an image signal according to claim 3, wherein said picture type detector detects, as an intra frame coding picture or a forward inter-frame coding picture, a picture whose sum of absolute values or sum of squares in a low-frequency region is larger than those of previous and subsequent pictures.

6. The apparatus for re-coding an image signal according to claim 1, wherein said DCT coefficient counter counts, as a feature amount, the number of DCT coefficients whose absolute values are larger or smaller than previously set threshold values, and
   said picture type detector detects a picture type in accordance with the obtained number.

7. The apparatus for re-coding an image signal according to claim 6, wherein said picture type detector detects, as an intra frame coding picture, a picture having a smaller number of DCT coefficients, with respect to other pictures, whose absolute values are larger than threshold values and a picture having a larger number of DCT coefficients, with respect to other pictures, whose absolute values are smaller than threshold values.

8. The apparatus for re-coding an image signal according to claim 1, wherein said coding control portion determines coding parameters using the picture type detected by the picture type detector.

9. The apparatus for re-coding an image signal according to claim 1, wherein said coding control portion determines coding parameters, using an intended coding amount set in accordance with the picture type detected by the picture type detector.

10. A method for recoding a previously encoded image signal using a decoded image signal as input, comprising:
   transforming the decoded image signal;
   counting features within the transformed decoded image on a high or low frequency-region basis using an unquantized coefficient output provided by the transforming;
   detecting a picture type of the encoded image signal associated with the previous encoding based upon the counted features;
   determining parameters for re-coding based upon the detecting; and
   recoding the decoded image signal based upon the determining.

11. The method according to claim 10, further comprising: detecting at least two of three kinds of picture types of an intra-frame picture, a forward inter-frame predictive coding picture, and a bi-directional inter-frame predictive coding picture.

12. The method according to claim 10, further comprising:
   counting one of a sum of absolute values and a sum of squares over a region of transformed image coefficients; and
   detecting a picture type in accordance with variations with time of one of the sum of absolute values and a sum of squares.

13. The method according to claim 12, further comprising: detecting an intra-frame coding picture by determining whether one of the sum of absolute values and the sum of squares in a first specified region is smaller than those of previous and subsequent pictures.

14. The method according to claim 12, further comprising: detecting one of an intra-frame coding picture and a forward inter-frame coding picture by determining whether one of the sum of absolute values and the sum of squares in a second region larger than those of previous and subsequent pictures.

15. The method according to claim 10, further comprising:
   counting a number of transformed coefficients having absolute values which are one of larger and smaller than previously set threshold values; and
   detecting a picture type in accordance with the number.

16. The method according to claim 15, further comprising:
   detecting an intra-frame coding picture by determining whether a picture having a smaller number of transform coefficients, with respect to other pictures, having absolute values larger than threshold values and a picture having a larger number of transform coefficients, with respect to other pictures, having absolute values smaller than threshold values.

17. The method according to claim 10, further comprising: determining coding parameters using the picture type.

18. The method according to claim 10, further comprising: determining coding parameters using an intended coding amount set in accordance with the detected picture type.

19. The method according to claim 10, wherein the transforming further comprises a DCT.

20. The method according to claim 12, wherein the transformed image coefficients are DCT coefficients and further wherein the region is a frequency region.

21. The method according to claim 13, wherein the transformed image coefficients are DCT coefficients and further wherein the first specified region is a high-frequency region.

22. The method according to claim 14, wherein the transformed image coefficients are DCT coefficients and further wherein the second specified region is a low-frequency region.

23. The method according to claim 16, wherein the transform coefficients further comprises DCT coefficients.

* * * * *